Patented July 10, 1951

2,560,329

UNITED STATES PATENT OFFICE 2,560,329

CATALYTIC DEHYDROGENATION OF PETROLEUM NAPHTHENES

Richard C. Brandon, Elizabeth, N. J., assignor to Standard Oil Development Company, a corporation of Delaware No Drawing. Application June 15, 1946, Serial No. 677,091

9 Claims. (Cl. 260—668)

This invention provides a method of dehydrogenating petroleum naphthenes to corresponding aromatics using a noble metal in a catalytic material resistant to ordinary poisons and capable of regeneration.

There has been considerable research work on the use of noble metal catalysts in dehydrogenating hydroaromatics. The noble metals have been recognized in the art as belonging in the class of the most active hydrogenation catalysts which catalyze hydrogenation at temperatures below 400° F. but which, in general, are very sensitive to various poisons, particularly sulfur compounds that are usually present in petroleum products. The hydrocarbons to be reacted in the presence of such catalysts must be practically sulfur free. Accordingly, the noble metal catalysts have been of little interest industrially.

The catalytic materials used in accordance with the present invention are very resistant to poisonous action of sulfur compounds, ogranic peroxides, and highly unsaturated polymers. They have been used in reacting petroleum products containing these substances for over 100 hours without loss of activity. They can be satisfactorily regenerated by controlled burning of the carbonaceous deposits which tend to form at elevated temperatures.

To prepare the catalytic material for the present method, a small amount of a patinum group, noble metal particularly selected from the class consisting of platinum and palladium, e. g., 0.1 to 10% by weight, is incorporated with a carrier of the nature of alumina, which is a hydrous oxide with ultramicroscopic pores. Silica gel is another example of this type of carrier.

Two kinds of procedures may be used for incorporating the platinum group metal with the carrier: (1) impregnation of the carrier with salt or acid solution (e. g., ammonium chloroplatinate or chloroplatinous acid), followed by slow drying, and heat decomposition or reduction of the deposited compound; and (2) mulling of the carrier in powdered form with colloidal size particles of the noble metal (e. g., platinum black) followed by extruding or pilling. The mulled mixture is extruded wet, then dried. The pilled mixture is dry when compressed into a compact form, such as a pill or pellet. The pilled or pelleted catalytic material is a preferred type for the present method.

The pelleted catalytic material may be used in a fixed bed type of operation or may be granulated for use with a fluid or moving catalyst technique in the dehydrogenation of the naphthene hydrocarbons.

The conditions of operation have to be rather specifically controlled to obtain a satisfactory yield of the dehydrogenated naphthenes in using the catalytic material resistant to poisoning and highly selective in dehydrogenating activity. The naphthenes, or a petroleum fraction containing the naphthenes, are passed in vaporized form over the catalytic material at temperatures in the range of 600° to 800° F. at ordinary atmospheric pressure.

The effectiveness of the catalytic materials is shown in the following test data:

TABLE 1

Dehydrogenation of ethyl cyclohexane over 2% Pt on $Al_2O_3$

| Hours | (Feed) | 0-6 | 6-10 | 10-14 | 14-18 |
|---|---|---|---|---|---|
| Temperature, °F | | | 600 | | |
| Pressure | | | Atmospheric | | |
| Feed Rate, v./v./hr | | | 1.0 | | |
| Spot Gas Analysis: | | | | | |
| $CO_2$, Mol Per Cent | | 0.0 | 0.0 | 0.0 | 0.0 |
| CO | | 0.0 | 0.0 | 0.0 | 0.0 |
| $O_2$ | | 1.6 | 1.0 | 0.5 | 1.0 |
| $N_2$ | | 6.4 | 4.0 | 2.0 | 4.0 |
| $H_2$ | | 89.6 | 94.8 | 94.8 | 93.4 |
| $CH_4$ | | 2.4 | 0.2 | 2.7 | 1.5 |
| Gas Yield, CF/B | | 1047 | 1002 | 920 | 875 |
| Inspection of Unit Condensate: | | | | | |
| Bromine No., cg./cc | 0 | 0 | 0 | 0 | 0 |
| Spec. Grav. 20/4° C | 0.7881 | 0.8118 | 0.8100 | 0.8081 | 0.8067 |
| Spec. Dispersion | 99.0 | 122.2 | 119.6 | 117.9 | 116.0 |
| Refractive Index, 20/D | 1.4332 | 1.4520 | 1.4507 | 1.4492 | 1.4479 |
| Conv. to Ethyl Benzene: | | | | | |
| From Density, Weight Per Cent | | 30 | 28 | 26 | 24 |
| From R. I., Weight Per Cent | | 30 | 28 | 25 | 23 |
| From Spec. Disp., Weight Per Cent | | 31 | 27 | 25 | 23 |

TABLE 2

Dehydrogenation of methyl cyclohexane over 2% Pt on $Al_2O_3$

| | Feed | Product |
|---|---|---|
| Operating Conditions: | | |
| Temperature, °F | | 750 |
| Pressure | | Atm. |
| Feed Rate, v./v./hr | | 0.5 |
| Inspections: | | |
| Density, 20/4° C | 0.7687 | 0.8293 |
| Spec. Dispersion | 103.0 | 154.4 |
| Conversion to Toluene: | | |
| From Spec. Dispersion | | 60 |
| From Ultraviolet Absorption | | 67 |

Test results, such as indicated in the tables, prove that the catalytic material is highly selective in splitting off hydrogen from the aromatic nucleus without substantial effects on alkyl side chain groups.

On account of the specific selectivity of the catalytic material at certain temperatures, a much better control of hydroforming can be obtained with this catalytic material than with conventional metal oxide hydroforming catalysts that generally have to be used at thermal cracking temperatures above 900° F. The platinized alumina pellets have their pronounced dehydrogenating action on the cyclic nucleus at temperatures in the range of 650° to 800° F., which is substantially below the thermal cracking temperature range. Accordingly, this catalytic material is used with particular effectiveness on petroleum fractions containing alkyl naphthenes boiling in the range of 200° to 400° F.

The examples are given for the purpose of illustration and it will be understood that modifications come within the scope of the claimed invention.

I claim:

1. The method of dehydrogenating a petroleum mono-alkyl naphthene which comprises passing the naphthene in vaporized form over a catalytic material containing 0.1 to 10% by weight of a platinum group noble metal selected from the class consisting of platinum and palladium mixed with a hydrous oxide carrier having ultra-microscopic pores at an elevated temperature in the range 650° F. to 800° F., said catalytic material being resistant to poisoning by sulfur.

2. The method of dehydrogenating a mono-alkyl naphthene which comprises passing vapor of the alkyl naphthene over platinized alumina pellets containing 0.1 to 10% by weight of finely-divided platinum at atmospheric pressure and at a temperature in the range of 650° F. to 800° F.

3. The method of dehydrogenating mono-alkyl naphthenes in a petroleum fraction boiling in the range 200° F. to 400° F., which comprises passing vapor of the petroleum fraction at a reaction temperature in the range of 650° F. to 800° F. over compact pieces of a catalytic material containing 0.1 to 10% by weight of a colloidal platinum group metal selected from the class consisting of platinum and palladium supported by a hydrous oxide carrier having ultra-microscopic pores.

4. The method as described in claim 3, in which the catalytic material after becoming coked is regenerated by controlled burning of coke deposits thereon at temperatures ranging from 700° F. to 1100° F., the regenerated catalytic material being used again for dehydrogenating alkyl naphthenes.

5. The method of dehydrogenating ethyl cyclohexane which comprises passing vapor of the ethyl cyclohexane over platinized alumina pellets containing 0.1 to 10% by weight of platinum at atmospheric pressure and at a temperature of 650° F. to 800° F., and recovering ethyl benzene as a product of the dehydrogenation.

6. The process for producing an alkyl aromatic hydrocarbon from a corresponding mono-alkyl naphthene present in a petroleum fraction containing sulfur compounds as contaminants which comprises passing vapor of the petroleum fraction at the reaction temperature in the range of 650° F. to 800° F. into contact with a catalytic material containing 0.1 to 10% by weight of a platinum group noble metal selected from the class consisting of platinum and palladium supported by a hydrous oxide carrier having ultra-microscopic pores, said catalytic material being resistant to poisoning by sulfur, regenerating said catalytic material, when its activity is reduced by formation of coke deposits thereon, by controlled burning of said coke deposits at a temperature ranging from 700° F. to 1100° F., further contacting more vapor of the petroleum fraction at the reaction temperature in the range of 650° F. to 800° F. with the thus regenerated catalytic material, and recovering a resulting alkyl aromatic product to which the mono-alkyl naphthene is converted.

7. A process for controlled hydroforming of a petroleum fraction containing mono-alkyl naphthenes boiling in the range of 200° F. to 400° F. to effect conversion of the said mono-alkyl naphthenes to the corresponding mono-alkyl aromatic hydrocarbons, which comprises contacting such fraction in vapor phase with a catalyst containing 0.1 to 10% by weight of platinum on alumina at a temperature above 650° F. to about 800° F.

8. A process for selectively dehydrogenating the cyclic nuclei of the mono-alkyl naphthenes, methyl cyclohexane and ethyl cyclohexane, in the presence of sulfur compounds, which comprises contacting said alkyl naphthenes in the vapor phase at a temperature above 650 F. to about 800° F. with a catalyst containing 0.1 to 10% by weight of platinum on alumina, said catalyst being resistant to poisoning by sulfur under conditions of the operation, and thereafter recovering a condensate product of toluene and ethyl benzene formed from the thus treated mono-alkyl naphthenes.

9. A process for controlled hydroforming of a petroleum fraction containing mono-alkyl naphthenes boiling in the range of 200° F. to 400° F. to effect conversion of said mono-alkyl naphthenes to the corresponding mono-alkyl aromatic hydrocarbons, which comprises contacting said fraction in vapor phase with a catalyst containing 0.1 to 10% by weight of a platinum group noble metal selected from the class consisting of platinum and palladium on alumina at a temperature in the range above 650° F., and substantially below the thermal cracking temperature range.

RICHARD C. BRANDON.

REFERENCES CITED

The following references are of record in the file of this patent:

UNITED STATES PATENTS

| Number | Name | Date |
|---|---|---|
| 2,272,711 | Hull | Feb. 10, 1942 |
| 2,400,012 | Littman | May 7, 1946 |
| 2,402,898 | Kirkpatrick | June 25, 1946 |
| 2,404,104 | Shepardson | July 16, 1946 |
| 2,411,726 | Holroyd et al. | Nov. 26, 1946 |
| 2,435,443 | Ipatieff et al | Feb. 3, 1948 |

OTHER REFERENCES

Zelinsky et al.: Jour. Ind. Eng. Chem.; vol. 27, 1209–1211 (1935).

Komarewsky et al.: The Oil and Gas Journal; June 24, 1943, 90 to 93, and 119 (1943).